United States Patent [19]

Esser

[11] Patent Number: 4,890,969
[45] Date of Patent: Jan. 2, 1990

[54] FLEXIBLE MANUFACTURING APPARATUS HAVING SEVERAL PARALLEL, SPACED-APART PROCESSING MACHINES

[75] Inventor: Karl-Josef Esser, Mönchengladbach, Fed. Rep. of Germany

[73] Assignee: Scharmann GmbH & Co., Mönchengladbach, Fed. Rep. of Germany

[21] Appl. No.: 191,232

[22] Filed: May 6, 1988

[30] Foreign Application Priority Data

May 6, 1987 [DE] Fed. Rep. of Germany ....... 3715032
May 26, 1987 [DE] Fed. Rep. of Germany ....... 3717683

[51] Int. Cl.$^4$ ............................................. B23Q 3/157
[52] U.S. Cl. ..................................... 414/277; 414/268; 414/286; 414/331; 414/749; 29/568; 198/346.2; 198/364
[58] Field of Search ............... 414/222, 225, 281, 282, 414/283, 286, 331, 749, 751, 268, 277, 279; 198/468.6, 470.1, 346.1, 346.2, 347, 364, 432; 29/568

[56] References Cited

U.S. PATENT DOCUMENTS 3,738,506 6/1973 Cornford et al. ............... 414/283 X
3,924,300 12/1975 Hilger et al. ...................... 414/281
4,227,296 10/1980 Wittenbreder ....................... 29/568
4,306,350 12/1981 Kielma et al. ........................ 29/568
4,656,728 4/1987 Saeki et al. ............................ 29/568
4,711,016 12/1987 Genschow et al. ................... 29/568
4,773,807 9/1988 Kroll et al. ...................... 414/286 X Primary Examiner—Frank E. Werner
Assistant Examiner—Robert S. Katz
Attorney, Agent, or Firm—Becker & Becker, Inc.

[57] ABSTRACT

A flexible manufacturing apparatus having several parallel, spaced-apart processing machines several shelf-like magazines disposed at the rear of the processing machines and extending transverse thereto, and transport mechanisms for conveying tools from the magazines to the processing machines. Two magazine rows are provided, each composed of magazine sections having superimposed, horizontal bottoms, including a lower shelf bottom and an upper shelf bottom, for holding tools. Transport mechanisms are provided in the form of a first upper transport mechanism, which, above the height of a person, is disposed on an upper transport rail, and a second lower transport mechanism, which, below the upper transport mechanism and at approximately half of the height thereof, is disposed on a lower transport rail. At least one mechanism is provided for conveying tools in a vertical plane from the lower shelf bottoms to the upper shelf bottoms, and vice versa.

19 Claims, 4 Drawing Sheets

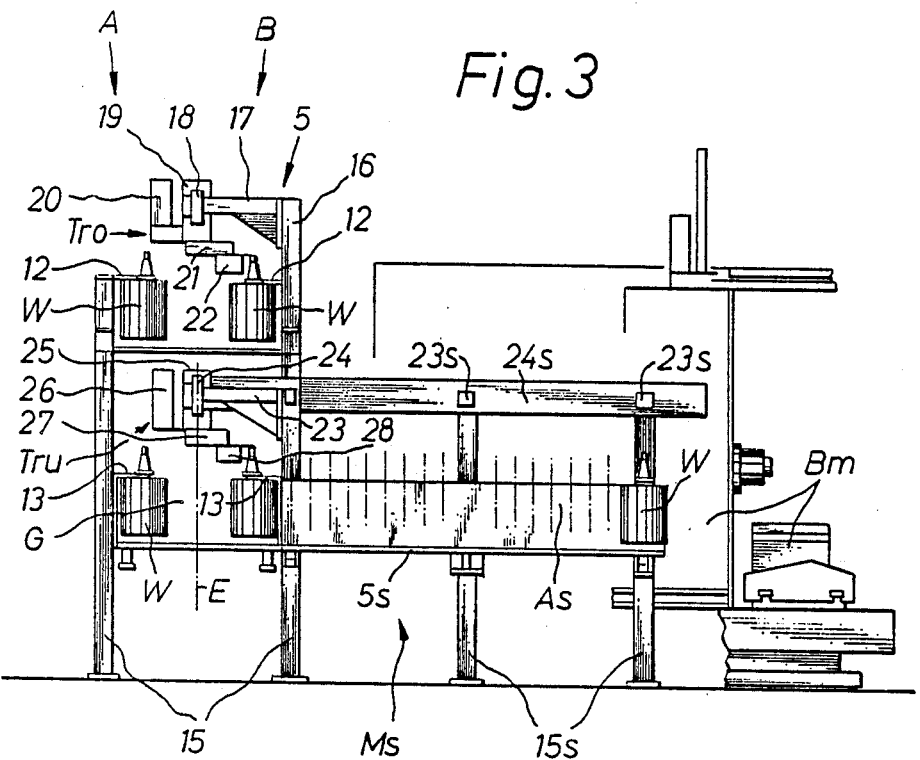
Fig. 3
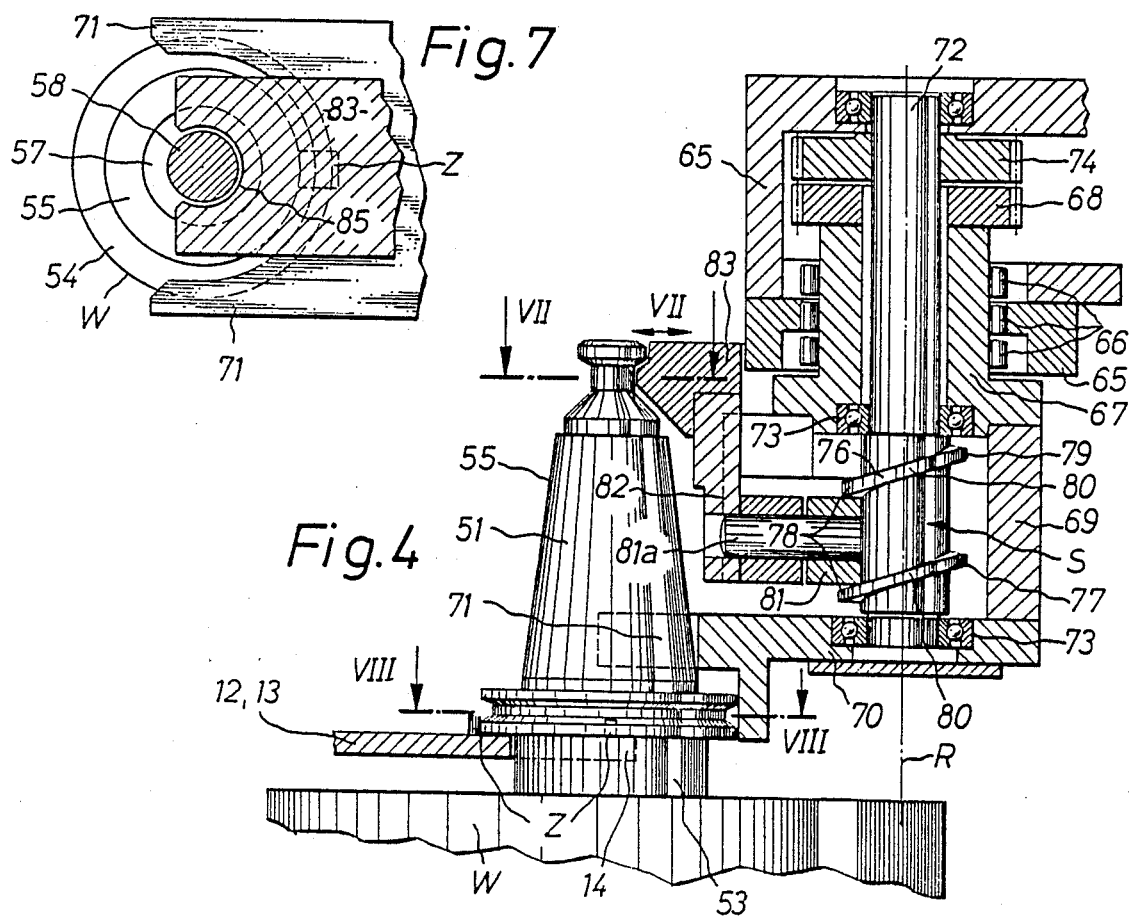
Fig. 7
Fig. 4

FLEXIBLE MANUFACTURING APPARATUS HAVING SEVERAL PARALLEL, SPACED-APART PROCESSING MACHINES

BACKGROUND OF THE INVENTION

The present invention relates to a flexible manufacturing apparatus having several parallel, spaced-apart yet side-by-side processing machines, such as drilling and milling machines, several shelf-like magazines that are disposed at the rear of the processing machines and extend transverse thereto, and transport means for conveying tools from the magazines to the processing machines or to magazines thereof.

It is an object of the present invention to improve heretofore known manufacturing apparatus of this general type, and to provide a manufacturing apparatus where the tools can be accommodated in magazines in a space-saving manner, and can be brought to and taken from the processing machines in a time saving manner. This is to be effected with structurally straightforward means that can be rapidly moved and can be operated without difficulty. It is a further object of the present invention to increase the effectiveness of a manufacturing system that is installed on a small floor space relative to the effectiveness of heretofore known systems, with not only the processing machines, but also the means for transporting the tools, being easily accessible.

BRIEF DESCRIPTION OF THE DRAWINGS

These and other objects and advantages of the present invention will appear more clearly from the following specification in conjunction with the accompanying schematic drawings, in which:

FIG. 3 is a view taken along the line III—III in FIG. 2;

FIG. 4 is a vertical, cross-sectional view showing the mechanism for grasping and transporting the tools;

FIG. 7 is a partial cross-sectional view taken along the line VII—VII in FIG. 4.

SUMMARY OF THE INVENTION

The manufacturing apparatus of the present invention comprises: two magazine rows, each comprised of magazine sections having superimposed, horizontal bottoms, including a lower shelf bottom and an upper shelf bottom, for holding tools; transport means in the form of a first upper transport mechanism, which, above the height of a person, is disposed on an upper transport rail, and a second lower transport mechanism, which, below the upper transport mechanism and at approximately half the height thereof, is disposed on a lower transport rail; and at least one mechanism for conveying tools in a vertical plane from the lower shelf bottoms to the upper shelf bottoms of the magazine sections, and vice versa.

As a result of the arrangement of the shelf-like magazines in two superimposed levels, a space-saving storage of tools is automatically assured. In so doing, however, accessibility to the processing machines from the back side is completely preserved. The transport mechanisms assure a rapid and especially precise grasping and transporting of the tools to and from the processing machines and the shelves.

Further specific features of the present invention will be described in detail subsequently.

DESCRIPTION OF THE PREFERRED EMBODIMENTS

Figure 1:
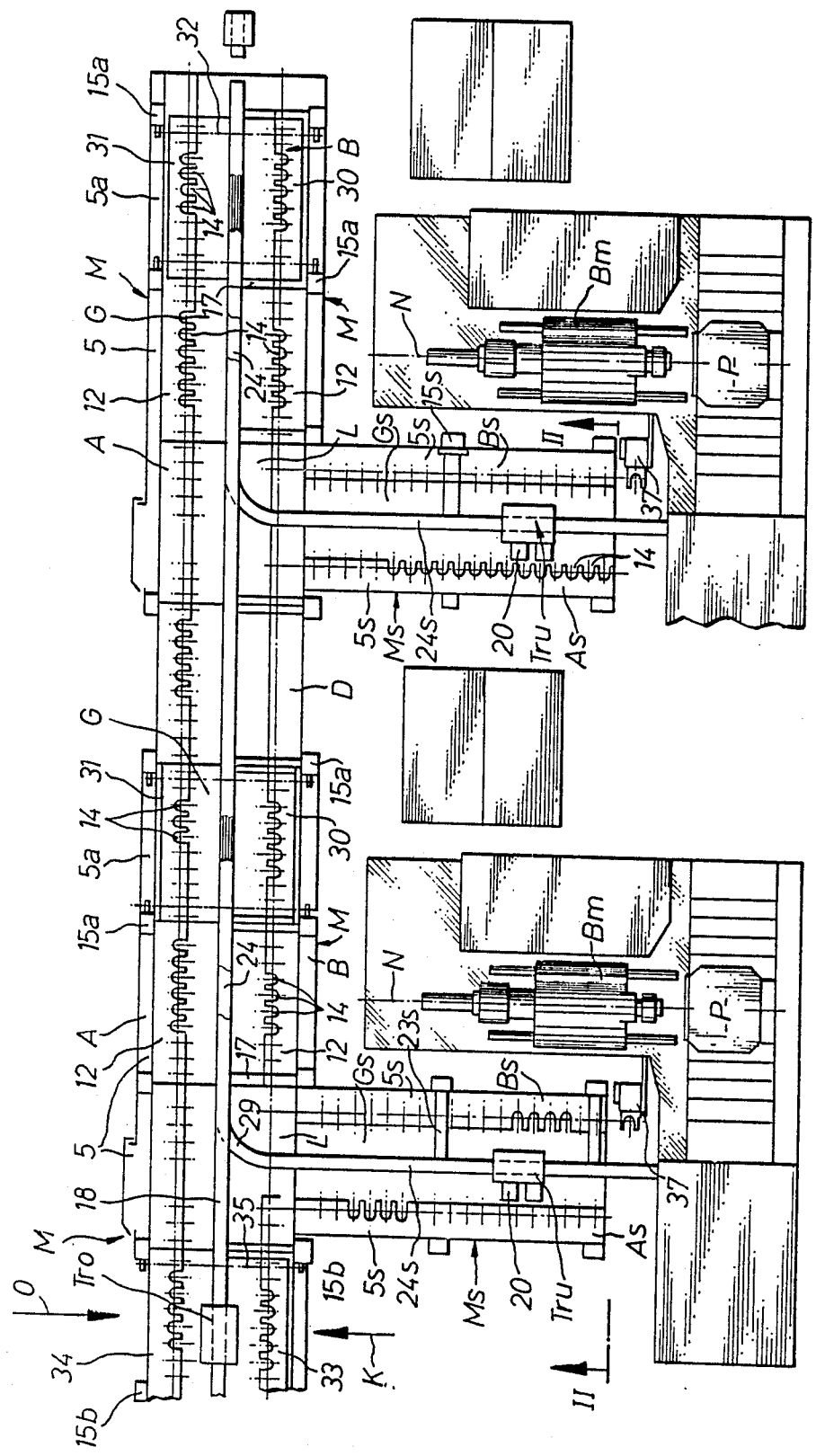
FIG. 1 is a plan view of one exemplary embodiment of the inventive manufacturing apparatus, with two processing machines.
Figure 2:
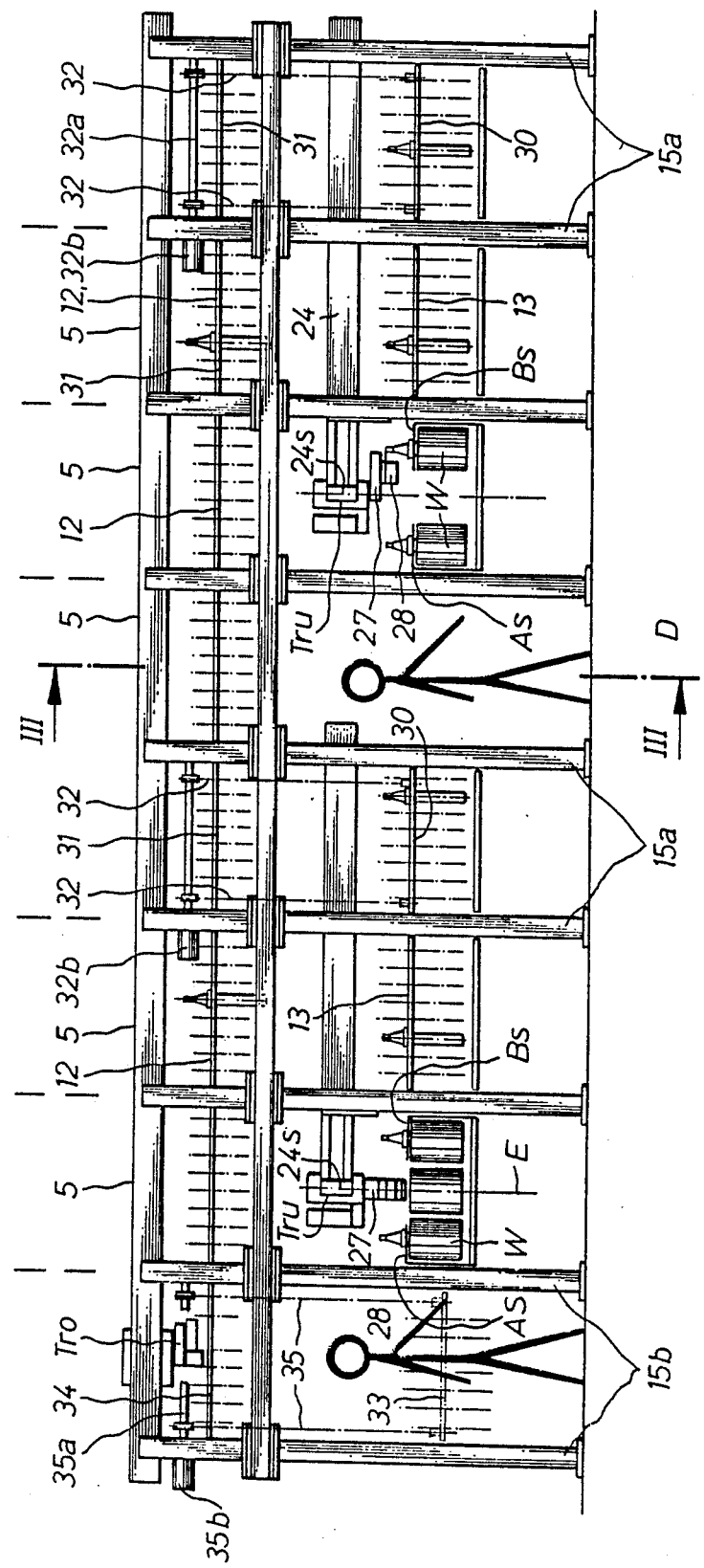
FIG. 2 is a view taken along the line II—II in FIG. 1.

Referring now to the drawings in detail, the two processing machines Bm can be seen in the plan view of FIG. 1. In front of the processing machines, the workpieces that are to be processed rest upon pallets P, which can be moved in the transverse direction in front of the processing machines Bm. Associated with the processing machines are magazines M that are disposed behind the processing machines Bm, parallel to the direction of movements of the pallets P for the workpieces. Extending parallel to the longitudinal central axis N of the processing machines are further magazines Ms which in principle have the same construction as do the magazines M that are disposed at the rear end of the processing machines Bm. The magazines M are disposed in two magazine rows A and B that are parallel to one another and to the direction of movement of the pallets P, while the magazines Ms are disposed in magazine rows As and Bs that are parallel to one another and perpendicular to the direction of travel of the pallets P. A street G is formed between the magazine rows A and B, and a street Gs is formed between the magazine rows As and Bs.

Each of the two parallel magazine rows A and B behind the processing machines Bm is provided with vertical magazine sections 5 that are successively arranged in a longitudinal direction. The magazine sections 5, in turn, have an upper shelf bottom 12 and a lower bottom shelf bottom 13. The upper and lower shelf bottoms 12, 13 of the two parallel magazine rows A and B are disposed in pairs in the same planes, and are provided with recesses 14, with the openings of oppositely disposed shelf bottoms facing one another, as can be seen in FIG. 1.

The shelf bottoms 12, 13 of the magazine rows A, B are held by support columns 15 that are oppositely disposed in pairs. One of the support columns 15 of a pair of such columns is provided with an extension 16 that projects beyond the two upper shelf bottoms 12. Disposed on this extension 16 is a gallows or bracket-like arm 17, the end of which carries an upper support rail 18. Guided on this support rail 18 is an upper transport mechanism Tro that has a guide member 19 that is provided with a drive unit 20. An arm 21 is pivotably disposed on the underside of the guide member 19 in the central plane of the street G, between the two magazine rows A and B. Disposed on the end of the arm 21 is a second pivot arm 22, the end of which grasps and supports the tools W. With reference to FIG. 3, this double arm 21, 22 permits tools from the left upper shelf bottom 12 to be brought into a middle position in the vertical plane E as well as into the right upper shelf bottom 12, and vice versa. Thus, the double arm can remove the tools W from the oppositely disposed recesses 14 of the upper shelf bottoms 12 and bring them into the central plane E of the street G, in order then to redeposit these tools at an appropriate location in one of the shelf bottoms, or to transport the tools further to a different transfer location.

That support column 15 of the rows A, B that carries the extension 16 with the bracket-like arm 17 is provided, at approximately half of the height of the column, with a further arm 23 of the same type as the arm 17. In other words, the free end of this arm 23 carries a lower support rail 24, on which one or more lower transport mechanisms Tru are longitudinally guided via a guide member 25 with drive units 26. The lower guide member 25 also supports pivotable arms 27, 28 that are in a position to grasp and transport the tools of the lower shelf bottom 13. Here also the tools are transported in the central plane E of the street between the shelf bottoms 13.

The rows As and Bs of the magazines Ms, which rows are disposed parallel to the longitudinal central axis N of the processing machines Bm, are provided with sections 5s that have support columns 15s that need no extension such as the extension 16 of the columns 15; this can be seen from FIG. 3. At the level of the parts 23, 24 of the columns 15, the columns 15s are provided with appropriate arms 23s and a rail 24s, on which the lower transport mechanisms Tru can be moved. For this purpose, the lower shelf bottoms 13 of the magazine row B extend over only a portion of the overall length of the magazine M, with one or more gaps L being provided, depending upon the number of processing machines Bm and the number of magazines Ms. Provided at the gaps L are bends 29 in the rails via which the rails 24 are horizontally connected with the rails 24s, so that lower transport mechanisms can bring tools out of the magazines M into the magazine Ms, and vice versa. The gap L has the length of a shelf bottom 13. Next to one of the gaps L of the lower shelf bottoms 13 of the magazine row B (next to the right gap L in FIG. 1), a further gap D is left in the row B at the same level; this further gap D similarly has the length of a shelf bottom. At the level of the gap D, the lower shelf bottom 13 of the magazine row A is also omitted, so that a free or clear passage that is as tall as a person results below the upper shelf bottoms 12 of the magazine rows A and B; the tools W, which are suspended on the arms 21, 22, are transported above this passage.

At one end (the right end in FIG. 1), the magazine or shelf sections 5a have a special configuration in the center of the rows A, B. At this location, shelf bottoms 30, 31 that are adjustable in height are disposed on the support columns 15a. Only a single shelf bottom 30 and 31 is associated with the section 5a of each row A, B. These shelf bottoms 30, 31 are interconnected by chains 32 that are guided over guide rollers of a drive shaft 32a. The length of the chains 32 is such that, for example, the shelf bottom 30 assumes its lowermost position at the level of the lower shelf bottom 13 of the row A, while the shelf bottom 31 assumes its uppermost position at the level of the upper shelf bottom 12 of the row B. The two shelf bottoms 30, 31 are thus interconnected in the manner of a counterweight train, and move in this fashion when the drive shaft 32a is actuated by a motor 32b.

The shelf sections 5b at the other end of the two magazine rows A, B (the left end in FIG. 1) have a similar configuration. There also, the two shelf bottoms 33, 34 are adjustable in height on columns 15b, and are interconnected and movable via chains 35 of a drive shaft 35a, with a motor 35b, in a manner similar to the bottoms 30, 31. One of the two shelf bottoms 33, 34 can be omitted, and the chains 35 can be wound on a roller on the shaft 35a. It is also possible to use a counterweight in place of the one shelf bottom. The shelf section 5b of the row B is accessible at the level of the lower shelf bottom 13 in the direction of the arrows K and 0 (FIG. 1), so that at this location it is possible to effect a mechanical or manual equipping of the shelf bottoms 33, 34. The length of the chains 35 is such that one of the shelf bottoms 33, 34, in its lowermost position, is disposed at a height that is favorable for the operator, thus facilitating loading and unloading of the shelf bottom, while the other movable shelf bottom is disposed at the level of the shelf bottoms 12 of the rows A, B.

Instead of a shelf bottom 33 or 34 suspended on the chains 35, a magazine cartridge can be used that corresponds to these shelf bottoms and that can be loaded and unloaded away from the apparatus and, for example via a forklift or similar device, can be brought into the position of the shelf bottom 33 or 34, where it can be connected with the chains 35.

At the end of each magazine row Bs is a transfer arm 37 via which the tools W, which are suspended in the shelf bottoms of the magazine rows A, B or As, Bs and are transported in the vertical position with the aid of the transport mechanisms Tru, are brought out of their vertical position and placed into a horizontal position, as a consequence of which the tools can be placed into the nonillustrated tool magazine on the processing machines Bm, or into the drilling spindle or the like of the machines.

The transport mechanism on the upper support rail 18 can convey tools from the upper shelf bottoms in any desired fashion and succession to the sections 5a at the ends of the rows A, B. In these sections, an exchange of the tools from the upper shelf bottoms 12 into the lower shelf bottoms 13, and vice versa, can be effected, or the tools from the movable shelf bottoms 30, 31 of the sections 5a can be conveyed directly from the transport mechanisms Tru of the lower support rails 24, 24s to the magazine rows A and B, or directly to the transfer arms 37.

For the aforementioned transportation process, the suspended tools W must be rapidly and precisely grasped and must be lifted out of or placed into the recesses 14 of the shelf bottoms 12, 13 of the sections 5 and 5s. Furthermore, the tools must be removed from or introduced into the transfer mechanism 37. For this purpose, the tools W have the shank 51 which, adjacent the upper side 52 of the tool, is provided with a cylindrical portion 53, to the top of which is connected an annular-groove-like bead 54, the outer diameter of which is appreciably greater than the outer diameter of the cylindrical portion 53. Disposed above the bead 54 is the cone 55 of the tool shank 51. Adjoining the cone 55 are first a cylindrical portion 56, as well as a conical portion 57 that tapers in an upward direction. Disposed above the conical portion 57 is again a cylindrical portion 58, and thereafter an outwardly directed conical abutment surface 59 and a further cylindrical portion 60.

In its rest position, the tool W is disposed in one of the recesses 14 of the shelf bottom 12, 13. In so doing, the annular-groove-like bead 54 of the tool is suspended upon the rim 63 of the recess 14, which has an opening angle of about 180°. The end portions of the recess 14 of the shelf bottom 12, 13 merge into outwardly directed curvatures or bevellings 64, so that the cylindrical portion 53 of the tool W can be suspended in, and withdrawn from, the recess 14 without difficulty in the direction of the double arrow P. In the rest position of the tool, the cylindrical portion 53 is suspended in the recess 14 in a precisely positioned manner (FIG. 7).

With the aid of the bearings 66, the part 67 of a pivot mechanism S is rotatably mounted in a housing 65 on the oüter arms 22, 28 of the transport mechanisms Tru and Tro. The part 67 is connected to a spur gear or pinion 68, via which the pivot mechanism S can be rotated. The part 67 is provided on one side with a downwardly directed extension 69, on which is disposed a horizontal arm 70, the forward region 71 of which has a prong-like, outwardly open configuration (FIG. 7), as will be described in detail subsequently. Mounted in the part 67, and extending to the arm 70, is a vertical shaft 72 that is rotatable about the central axis R with the aid of the two bearings 73. Rotation is effected via a spur gear or pinion 74, the diameter and the number of teeth of which correspond to the diameter and the number of teeth of the gear 68, so that when the arm part 67 rotates with the aid of the gear 68, no relative rotation of the shaft 72 relative to the part 67 results.

The lower portion of the shaft 72 between the two bearings 73 is provided with two parallel, closed threads 76, 77, each of which is provided with a lower horizontal region 78, and an upper, similarly horizontal, region 79, and between these regions an inclined thread section 80. A cam roller 81 meshes between the two threads 76, 77 and is adjustable in height via these threads upon rotation of the shaft 72. The shaft 81a of the cam roller 81 is mounted in an angular part 82 that is guided in a non-illustrated manner on the housing 65 in such a way that the shaft 81a can be adjusted in height. The head 83 of the part 82 again has a prong-like configuration, with the opening thereof being directed opposite to the opening of the recess 14 of the shelf bottom 12, 13. The inner rim of the thus embodied recess 84 of the head 83, which, like the recess 14, has a periphery of 180° and sections that correspond to the bevellings or curvatures of the recess 14, is provided with a cylindrical section 85 (FIGS. 5-7), above which is connected a conical section 86 that adjoins a further section 87. The configuration and arrangement of these sections of the head 83 conform to the configuration of the sections 58, 59, and 60 of the tool shank 51. The sections 85 and 87 of the head 83 rest flush against the sections 58 and 60 of the tool shank 51 regardless of whether, as described below, the conical section of the head 83 rests against the conical section 59 of the shank 51, in other words, whether the tool is being raised by the head 83 or if the head 83 is disposed in its lowermost position. In this way, in addition to an exact positioning of the tool W in the shelf bottom 12, 13, a precise positioning of the tool relative to the arm part 67 and its components is also provided.

Figure 5:
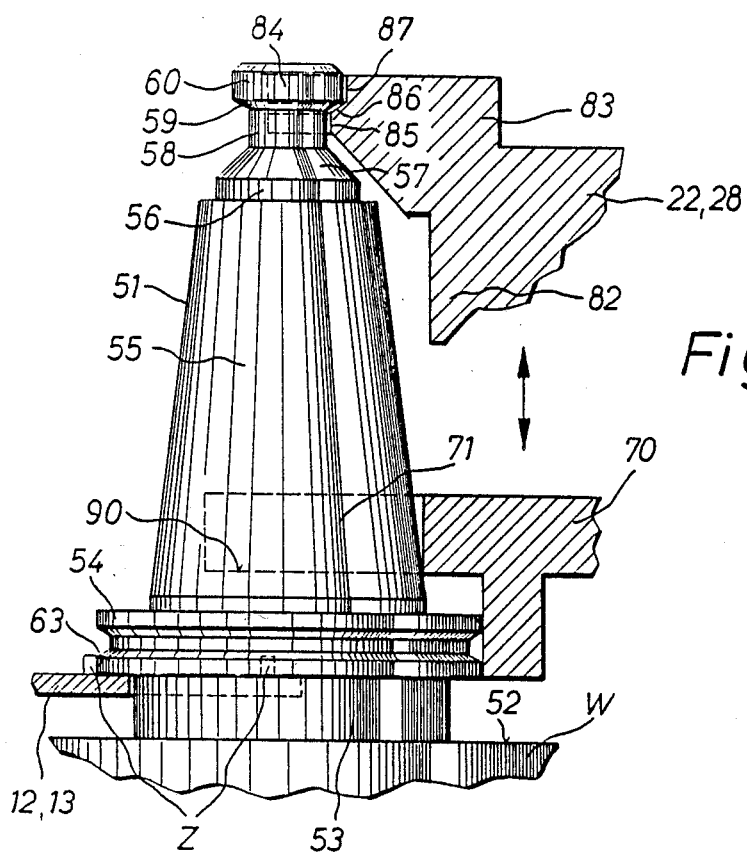
FIGS. 5 & 6 are enlarged views showing a tool and those parts of the transport mechanism that engage the tool, with FIG. 5 showing the tool in its starting position, and FIG. 6 showing the tool in a position in which it is connected with the transport mechanism.
Figure 8:
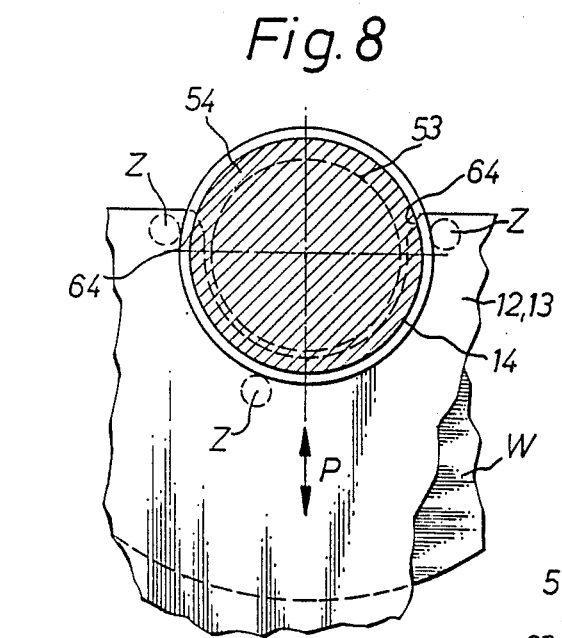
FIG. 8 is a partial cross-sectional view taken along the line VIII—VIII in FIG. 4.
Figure 6:
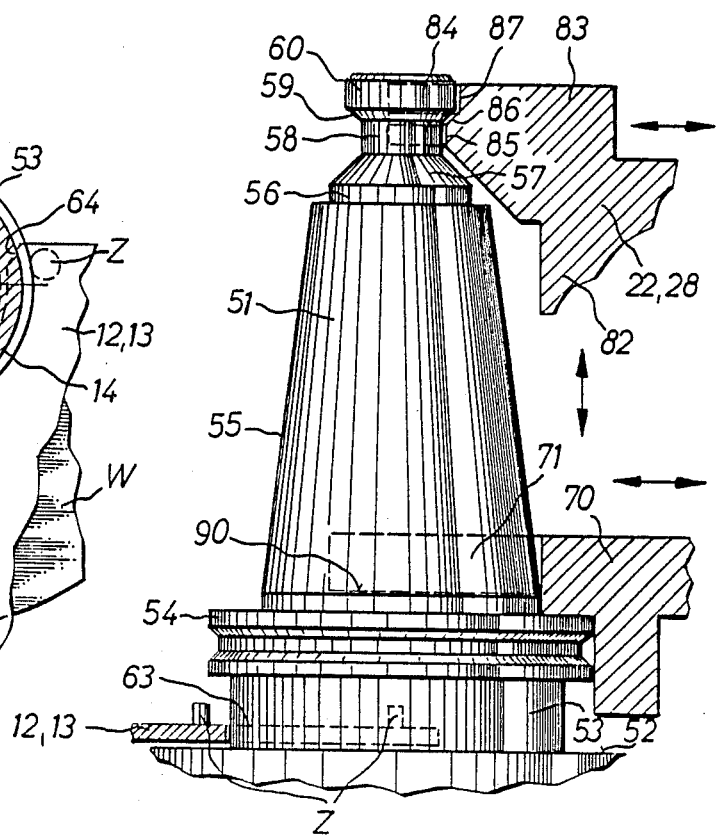

The tool W and its parts initially have the position illustrated in FIG. 5, where, as indicated, the annular-groove-like bead 54 rests upon the rim 63 of the recess 14. If the shaft 72 is rotated with the aid of its spur gear 74, the cam roller 81, with the aid of the closed threads 76, 77, is raised into the position illustrated in FIG. 6, with the head section 86 resting against the conical section 59. In so doing, the annular-groove-like bead 54 comes to rest against the bottom edge 90 of the similarly prong-like region 71 of the arm 70. As a result, the tool W is tensioned along with the arm, so that the tool can be rotated and transported by this arm. During such rotation, due to the similarity of the drive gears 68 and 74, the tool maintains its coordinate position and can be moved linearly, even though the part 67 rotates.

If the tool is to be introduced into a recess 14 of one of the shelf bottoms 12, 13, the arm part 67 moves the tool into the recess 14, with the tool again being positioned in the recess. If the head 83 is now lowered with the aid of the threads 76, 77 and the cam roller 81, the bead 54 again rests upon the rim 63 of the recess 14, and the head 83 can be moved from the sections 58, 59, and 60 of the tool shank 51.

If the upper portion of the tool shank is provided, for example, with a cylindrical bead instead of the conical abutment surface 59, the section 86 of the head 83 is embodied as a horizontal projection.

As can be recognized, raising the bead 53 of the tool from the shelf bottom 12, 13 simultaneously effects a holding with the transport mechanism, here with the arm 22, 28.

In place of the pivot mechanism S, with the aid of which the tool W is removed from or introduced into the recess 14 of the shelf bottom 12, 13, any other also linearly moved device can be used that effects removal and introduction of the tools from or into their rest position on the shelf bottom.

If the shape of the shank head of the tool deviates from the illustrated conventional shape, the head 83 of the lifting mechanism is correspondingly embodied in order to assure that the tool W can be raised in the manner described.

The prong-shaped portions of the parts 83, 70, and 62, and their recesses, are embodied in such a way that the rims thereof form abutments for the corresponding sections of the tool shank, thus making possible a precise grasping and positioning of the tools.

The positioning of the tools in the recesses of the shelf bottom 12, 13 and of the arm 70 and of the head 83 can be effected in a known manner, for example via centering pins Z, or similarly-operating pins, that cooperate with a portion of the tool or its shank 51.

The present invention is, of course, in no way restricted to the specific disclosure of the specification and drawings, but also encompasses any modifications within the scope of the appended claims

What I claim is:

1. A flexible manufacturing apparatus having several parallel, spaced-apart yet side-by-side processing machines, several shelf-like magazines disposed at the rear of said processing machines and extending transverse thereto, and transport means for conveying tools from said magazines to said processing machines or to magazines thereof; said apparatus further comprises:

two magazine rows, each of which is comprised of lower and upper magazine sections having superimposed bottoms, including a lower shelf bottom and an upper shelf bottom, for holding tools;

an upper transport rail;

a lower transport rail;

transport means in the form of a first upper transport mechanism, which, above the height of a person, is disposed on said upper transport rail, and a second lower transport mechanism, which, below said upper transport mechanism end at approximately half the height thereof, is disposed on said lower transport rail; and at least one means for conveying tools suspended vertically for horizontal transporting and transferable in a vertical plane from said lower to said upper magazine sections, and vice versa.

2. An apparatus according to claim 1, in which said tools are adapted to be suspended vertically in said shelf bottoms and in said transport mechanisms.

3. A flexible manufacturing apparatus having several parallel, spaced-apart yet side-by-side processing machines, several shelf-like magazines disposed at the rear of said processing machines and extending transverse thereto, and transport means for conveying tools from said magazines to said processing machines or to magazines thereof; said apparatus further comprises:
   two magazine rows, each of which is comprised of lower and upper magazine sections having superimposed bottoms, including a lower shelf bottom and an upper shelf bottom, for holding tools;
   an upper transport rail;
   a lower transport rail;
   transport means in the form of a first upper transport mechanism, which, above the height of a person, is disposed on said upper transport rail, and a second lower transport mechanism, which, below said upper transport mechanism and at approximately half the height thereof, is disposed on said lower transport rail;
   at least one means for conveying tools suspended vertically for horizontal transporting and transferable in a vertical plane from said lower to said upper magazine sections, and vice versa, said tools being adapted to be suspended vertically in said shelf bottoms and in said transport mechanisms; and
   streets formed between said magazine rows, and in particular between said shelf bottoms thereof, with said transport mechanisms being movable in said streets; said upper transport rail being provided above said upper shelf bottom, and said lower transport rail being provided above said lower shelf bottom; and in which said transport mechanisms are provided with gripper means that are pivotable, linearly movable, and are guided on said upper and lower transport rails.

4. An apparatus according to claim 3, in which, at the level of said lower shelf bottoms, both of said magazine rows are interrupted to form common passage means.

5. An apparatus according to claim 3, in which said means for conveying tools between said lower and upper shelf bottoms includes at least one mechanism that comprises two further shelf bottoms that are interconnected in the manner of a weight compensator and are moved together via a drive shaft.

6. An apparatus according to claim 5, in which, in a starting position, said further shelf bottoms are disposed at the level of said upper and lower shelf bottoms.

7. An apparatus according to claim 5, in which said conveying means also includes a mechanism with additional shelf bottoms that is adapted to convey tools from a loading position to the level of said upper shelf bottoms of said magazine rows.

8. An apparatus according to claim 3, in which said means for conveying tools between said lower and upper shelf bottoms includes at least one mechanism that comprises a single further shelf bottom that can be moved up and down, with chain means being provided to effect said movement, with said chain means having an end that is remote from said further shelf bottom and either carries a counterweight or is looped about a drive shaft.

9. An apparatus according to claim 3, in which said upper transport rail of said upper transport mechanism is linear and continuous; in which said lower shelf bottoms of one of said magazine rows are interrupted by gaps; and in which said lower transport rail of said lower transport mechanism is interrupted at said gaps of said lower shelf bottoms, with said transport mechanisms being guided and movable on said transport rails.

10. An apparatus according to claim 9, in which said interrupted lower transport rail is provided with extensions that branch off at right angles thereto and extend to said processing machines parallel to a longitudinal axis thereof.

11. An apparatus according to claim 9, in which said lower transport rail, in the region of said gaps of said lower shelf bottoms, has curved rail sections that angle-off from said lower transport rail and respectively merge into a further guide rail for a lower transport mechanism, with said further guide rail extending parallel to a longitudinal axis of said processing machines.

12. An apparatus according to claim 3, in which each of said transport rails has several transport mechanisms associated therewith.

13. An apparatus according to claim 3, in which each of said transport mechanisms is provided with at least one pivot arm having a free end for carrying said gripper means for said tools.

14. An apparatus according to claim 13, in which said shelf bottoms include recesses with rims for engaging tools; in which each tool has a shank with a head, and an annular bead; and in which each gripper means of said transport mechanisms includes a lifting mechanism, for engaging said head of said tool shank, and an arm that is disposed in the vicinity of said annular bead between the latter and said head of said tool shank, with said arm having an underside, remote from said head of said tool shank, against which said annular bead of said tool is pressed when said lifting mechanism lifts said annular bead from said rim of said recess of said shelf bottom.

15. An apparatus according to claim 14, in which said head of said tool shank is conical, and said lifting mechanism is provided with a pronged arm that is open at one end and extends below said conical head of said tool shank.

16. An apparatus according to claim 15, in which said arm of said gripper means also has a prong-like configuration with an open end, with the openings of said pronged arms of said gripper means and said lifting mechanism being directed opposite to said recesses of said shelf bottoms.

17. An apparatus according to claim 16, in which said transport mechanism includes a shaft with two closed pitched threads, and said lifting mechanism includes a cam roller that is adjustable in height between said two threads.

18. An apparatus according to claim 17, in which said transport mechanism includes a housing and a pivot mechanism that is accommodated in said housing, with said pronged arms and said lifting mechanism being disposed on said pivot mechanism.

19. An apparatus according to claim 18, in which said pivot mechanism and said shaft for said cam roller are coaxially disposed, with said pivot mechanism and said shaft being provided with respective spur gears of the same diameter and tooth count.

* * * * *